United States Patent
Chai

(10) Patent No.: US 9,740,064 B2
(45) Date of Patent: Aug. 22, 2017

(54) DISPLAY PANEL AND COLOR FILTER SUBSTRATE THEREOF

(71) Applicant: SHENZHEN CHINA STAR OPTOELECTRONICS TECHNOLOGY CO., LTD., Shenzhen (CN)

(72) Inventor: Li Chai, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,342

(22) PCT Filed: Aug. 20, 2014

(86) PCT No.: PCT/CN2014/084818
§ 371 (c)(1),
(2) Date: Jan. 22, 2015

(87) PCT Pub. No.: WO2016/008196
PCT Pub. Date: Jan. 21, 2016

(65) Prior Publication Data
US 2017/0115520 A1   Apr. 27, 2017

(30) Foreign Application Priority Data
Jul. 17, 2014   (CN) .......................... 2014 1 0341170

(51) Int. Cl.
*G02F 1/1343*   (2006.01)
*G02F 1/1335*   (2006.01)

(52) U.S. Cl.
CPC .... *G02F 1/13439* (2013.01); *G02F 1/133512* (2013.01); *G02F 1/133514* (2013.01);
(Continued)

(58) Field of Classification Search
None
See application file for complete search history.

(56) References Cited

U.S. PATENT DOCUMENTS

| 5,754,266 A * | 5/1998 | Ohta | ................. G02F 1/133512 349/110 |
| 6,690,446 B1 * | 2/2004 | Okamoto | ............ G02F 1/13394 349/181 |

(Continued)

FOREIGN PATENT DOCUMENTS

| CN | 101178526 A | 5/2008 |
| CN | 102436087 A | 5/2012 |

(Continued)

OTHER PUBLICATIONS

International Search Report (Forms PCT/ISA/210 and PCT/ISA/220) and the Written Opinion (Form PCT/ISA/237) issued on Apr. 20, 2015, by the State Intellectual Property Office of China acting as the International Searching Authority in corresponding International Application No. PCT/CN2014/084818. (12 pages).

*Primary Examiner* — Ryan Crockett
(74) *Attorney, Agent, or Firm* — Buchanan Ingersoll & Rooney PC

(57) ABSTRACT

The present disclosure discloses a display panel and a color filter substrate, said color filter substrate comprising first coplanar transparent conductive layers, and second coplanar transparent conductive layers that are spaced from said first coplanar transparent conductive layers, wherein each of said first coplanar transparent conductive layers is arranged in a region corresponding to a corresponding one of gate lines of an array substrate, and is applied with a signal in synchronism with and the same as a driving signal of said corresponding gate line; and each of said second coplanar transparent conductive layers is arranged in a region corresponding to a corresponding one of pixels of said array (Continued)

substrate, and serves as a common electrode; and wherein said first coplanar transparent conductive layers and said second coplanar transparent conductive layers are transparent conductive layers without patterns therein. The RC delay effect of the gate lines of array substrate can be avoided by said color filter substrate, and thus the display quality of products can be improved.

8 Claims, 3 Drawing Sheets

(52) U.S. Cl.
CPC ............ *G02F 2001/134354* (2013.01); *G02F 2201/121* (2013.01)

(56) References Cited

U.S. PATENT DOCUMENTS

| | | | |
|---|---|---|---|
| 9,429,797 B2* | 8/2016 | Chai | ................ G02F 1/133345 |
| 2007/0024767 A1 | 2/2007 | Lee et al. | |
| 2012/0327354 A1* | 12/2012 | Yoshida | ............ G02F 1/136286 |
| | | | 349/143 |
| 2013/0155364 A1 | 6/2013 | Dong et al. | |
| 2013/0155365 A1* | 6/2013 | Dong | ................ G02F 1/134309 |
| | | | 349/139 |
| 2014/0168555 A1 | 6/2014 | Um et al. | |

FOREIGN PATENT DOCUMENTS

| | | |
|---|---|---|
| CN | 102436088 A | 5/2012 |
| CN | 102998859 A | 3/2013 |

* cited by examiner

US 9,740,064 B2

DISPLAY PANEL AND COLOR FILTER SUBSTRATE THEREOF

CROSS REFERENCE TO RELATED APPLICATION

The present application claims benefit of Chinese patent application CN 201410341170.6, entitled "Display Panel and Color Filter Substrate thereof" and filed on Jul. 17, 2014, which is incorporated herein by reference.

FIELD OF THE INVENTION

The present disclosure relates to the technical field of liquid crystal display, particularly to a display panel and a color filter substrate thereof.

BACKGROUND OF THE INVENTION

With the development of information society, the demand for display devices is increasing, and the rapid development of the industry of liquid crystal display panels is promoted. Moreover, user requirements on wide-angle, low energy consumption and display quality are increasingly high. As a result, the development of liquid crystal display panels is increasingly diversified.

Currently, Polymer Sustained Vertical Alignment (PSVA) is widely used in liquid crystal display panels. Under this model of alignment, reactive monomer is added into liquid crystal materials. After the panel is formed, an electric field is applied to the panel so as to enable the liquid crystals inclined. Then, an ultraviolet is utilized to motivate monomer reaction in the liquid crystals, so that the liquid crystals will be inclined to the driving direction of the electric field, thus achieving the characteristic of multi-domain.

The transparent electrode of the color filter substrate under the PSVA model is constituted by a whole piece of transparent conductive layer, without any pattern therein. In this manner, the voltage in different regions of the transparent conductive layer of the color filter substrate is consistent. The transparent electrode serves as common electrode, and the voltage thereof is generally 6V.

It is found by the inventors that there is at least the following technical defect existing in the prior art. Under the PSVA model, there is a certain voltage difference between the voltage of the transparent conductive layer of the color filter substrate and the voltage of the gate lines of the array substrate, and as a result, a capacitor with certain charge storage capacity is formed. Consequently, a RC delay effect of gate lines of the array substrate is caused, and the driving signal of the gate lines would distort severely, thereby affecting the display quality of the products.

Therefore, a solution to avoid the RC delay effect of the gate lines of array substrate and to improve the display quality of products is urgently needed.

SUMMARY OF THE INVENTION

One of the technical problems to be solved by the present disclosure is providing a color filter substrate, which can avoid the RC delay effect of gate lines of the array substrate and improve the display quality of products. In addition, the present disclosure also provides a display panel comprising said color filter substrate.

1) To solve the aforesaid technical problem, the present disclosure provides a color filter substrate, comprising first coplanar transparent conductive layers, and second coplanar transparent conductive layers that are spaced from said first coplanar transparent conductive layers, wherein each of said first coplanar transparent conductive layers is arranged in a region corresponding to a corresponding one of gate lines of an array substrate, and is applied with a signal in synchronism with and the same as a driving signal of said corresponding gate line;

each of said second coplanar transparent conductive layers is arranged in a region corresponding to a corresponding one of pixels of said array substrate, and serves as a common electrode; and said first coplanar transparent conductive layers and said second coplanar transparent conductive layers are transparent conductive layers without patterns therein.

2) In one preferred embodiment of item 1) of the present disclosure, each sub pixel of said array substrate comprises a main pixel region and a secondary pixel region, and each of said first coplanar transparent conductive layers is applied with a signal in synchronism with and the same as a driving signal of a corresponding gate line in said main pixel region.

3) In one preferred embodiment of item 1) or item 2) of the present disclosure, said first coplanar transparent conductive layers and said second coplanar transparent conductive layers are made of indium tin oxide.

4) In one preferred embodiment of any one of item 1) to item 3) of the present disclosure, the distance between said first coplanar transparent conductive layers and said second coplanar transparent conductive layers ranges from 2.5 μm to 15 μm.

5) On the other hand, the present disclosure also provides a display panel, comprising an array substrate and a color filter substrate arranged opposite to and parallel with said array substrate, said color filter substrate comprising first coplanar transparent conductive layers and second coplanar transparent conductive layers that are spaced from said first coplanar transparent conductive layers, wherein each of said first coplanar transparent conductive layers is arranged in a region corresponding to a corresponding one of gate lines of an array substrate, and is applied with a signal in synchronism with and the same as a driving signal of said corresponding gate line;

each of said second coplanar transparent conductive layers is arranged in a region corresponding to a corresponding one of pixels of said array substrate, and serves as a common electrode; and said first coplanar transparent conductive layers and said second coplanar transparent conductive layers are transparent conductive layers without patterns therein.

6) In one preferred embodiment of item 5) of the present disclosure, each sub pixel of said array substrate comprises a main pixel region and a secondary pixel region, and each of said first coplanar transparent conductive layers is applied with a signal in synchronism with and the same as a driving signal of a corresponding gate line in said main pixel region.

7) In one preferred embodiment of item 5) or item 6) of the present disclosure, said first coplanar transparent conductive layers and said second coplanar transparent conductive layers are made of indium tin oxide.

8) In one preferred embodiment of any one of item 5) to item 7) of the present disclosure, the distance between said first coplanar transparent conductive layers and said second coplanar transparent conductive layers ranges from 2.5 μm to 15 μm.

Compared with the prior art, one embodiment or a plurality of embodiments of the aforementioned solution can bring about the following advantages or beneficial effects.

According to embodiments of the present disclosure, the transparent electrodes of the color filter substrate are separated into transparent electrodes corresponding to the region of gate lines of the array substrate and transparent electrodes corresponding to the region of pixels of the array substrate, which are applied with different signals, so that there is no voltage difference between the gate lines of the array substrate and the transparent electrodes of the color filter substrate. Therefore, the signal attenuation of the gate lines of the array substrate caused by the coupling capacitance therein can be avoided and the display quality of display panels can be improved.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure, and constitute a part of the description. The drawings, together with the embodiments, are used for interpreting the present disclosure, not to limit the present disclosure.

DETAILED DESCRIPTION OF THE EMBODIMENTS

Figure 1:
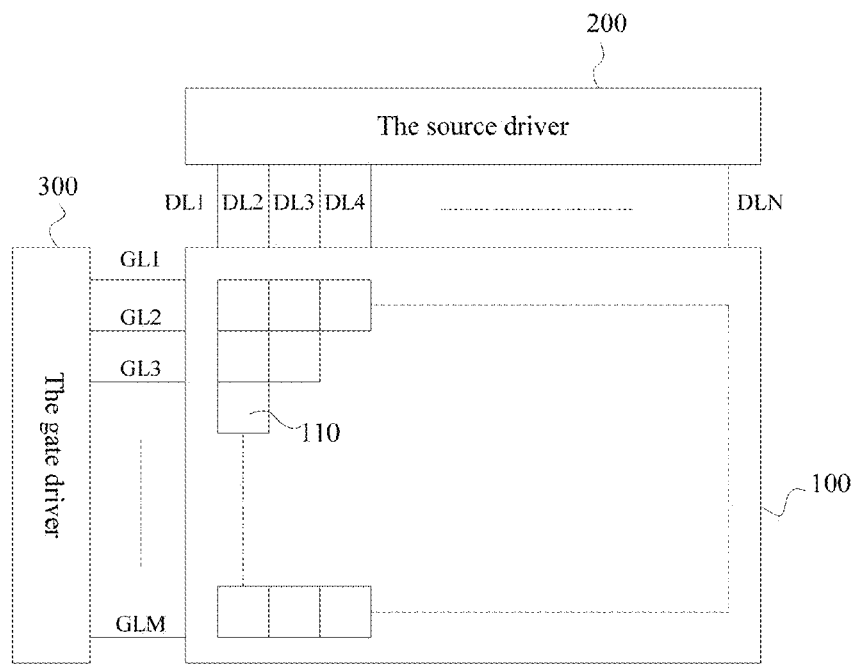
FIG. 1 is a structural schematic diagram of a display panel according to an embodiment of the present disclosure.

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

The explanations of the embodiments hereinafter refer to the signs of the drawings to instantiate the specific embodiments by which the present disclosure can be implemented. The directional terms used in the context, such as "up", "down", "left" and "right" et al, only refer to the directions as shown in the drawings. Therefore, such directional terms herein are used for explaining and understanding the present disclosure, not for limiting the present disclosure.

In addition, for the purpose of clarity, the size and thickness of each component shown in the drawings are shown arbitrarily, and would not restrict the present disclosure in any event.

FIG. 1 is a structural schematic diagram of a display panel according to an embodiment of the present disclosure. The display panel comprises an image display area 100, a source driver 200 and a gate driver 300. The image display area 100 comprises an array substrate and a color filter substrate, said array substrate comprising an array formed by a plurality of data lines (N data lines DL1-DLN as shown in FIG. 1) and a plurality of gate lines (M gate lines GL1-GLM as shown in FIG. 1) that are configured orthogonally to each other, and a plurality of pixel structures 110. The source driver 200, through a plurality of data lines coupled therewith, transmits the data signals provided to the array substrate. The gate driver 300, through a plurality of gate lines coupled therewith, transmits the scanning signals provided to the array substrate.

It should be noted that, the term "pixel structure" used herein comprises a plurality of sub pixels, and each sub pixel is arranged in a respective region of a plurality of sub pixel regions formed by the plurality of data lines and the plurality of scanning lines that are configured orthogonally to each other. In the present embodiment, the term "sub pixel" may be a sub pixel with a certain color, such as red sub pixel (R), green sub pixel (G), and blue sub pixel (B).

Figure 2:
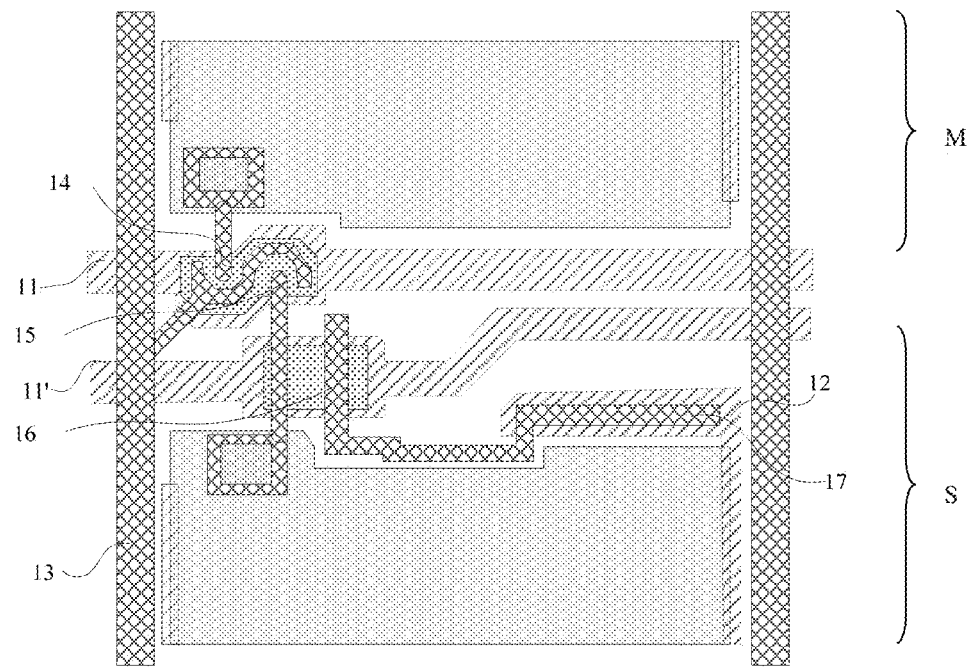
FIG. 2 is a structural schematic diagram of a sub pixel as an example.

FIG. 2 is a structural schematic diagram of a sub pixel as an example, which can be used in the display panel shown in FIG. 1.

As shown in FIG. 2, said sub pixel is separated into a main pixel region M and a secondary pixel region S. The sub pixel comprises a gate line 11 in the main pixel region, a gate line 11' in the secondary pixel region, a common line 12, a data line 13, a switching element 14 in the main pixel region, a switching element 15 in the secondary pixel region, a shared switching element 16, and a pulldown capacitor 17. In the aforesaid configuration, the voltage of the secondary pixel region S can be pulled down by the shared switching element 16 and the pulldown capacitor 17 when the switching element 15 in the secondary pixel region is on. Therefore, a difference between the liquid crystal rotation amount of the main pixel region M and the liquid crystal rotation amount of the secondary pixel region S will be generated, thus achieving a wide-angle of the display panel.

The whole structure of the sub pixel is explained hereinafter with reference to FIG. 2 and FIG. 3.

Figure 3:
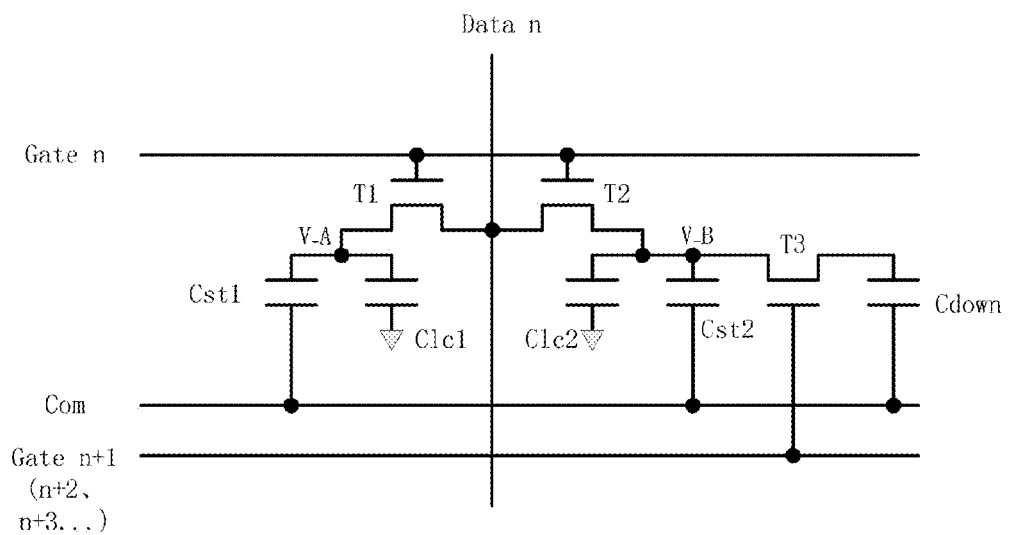
FIG. 3 is a schematic diagram of an equivalent circuit of the sub pixel as shown in FIG. 2.

FIG. 3 is a schematic diagram of an equivalent circuit of the sub pixel shown in FIG. 2. The sub pixel comprises switching elements (T1, T2 and T3), storage capacitors (Cst1 and Cst2), and liquid crystal capacitors (Clc1 and Clc2). The switching elements T1, T2 and T3 are all preferably made of thin film transistor. As shown in FIG. 3, the gate of the switching element T1 in the main pixel region and the gate of the switching element T2 in the secondary pixel region are both connected with a scanning line Gate n, and the sources of T1 and T2 are both connected with a data line Data n. The source of the shared switching element T3 is connected with the drain of the switching element T2 in the secondary pixel region, the drain of the shared switching element T3 is connected with a pulldown capacitor Cdown, and the gate of the shared switching element T3 is connected with a scanning line Gate n+1 (or Gate n+2, Gate n+3, . . . ). When a turn-on voltage is input into the scanning line Gate n, T1 and T2 are turned on simultaneously, and the main pixel region M and the secondary pixel region S both receive the data signal of the data line Data n and thus have a first electrical potential. When the charging process comes to an end, the voltage V_A of the main pixel region M and the voltage V_B of the secondary pixel region S are equal to each other. When a turn-on voltage is input into the scanning line Gate n+1, T3 is turned on, and the voltage V_B of the secondary pixel region S is pulled down by the pulldown capacitor Cdown. Therefore, a voltage difference between the voltage V_B of the secondary pixel region S and the voltage V_A of the main pixel region M is generated, thereby achieving an effect of low color shift.

Figure 4:
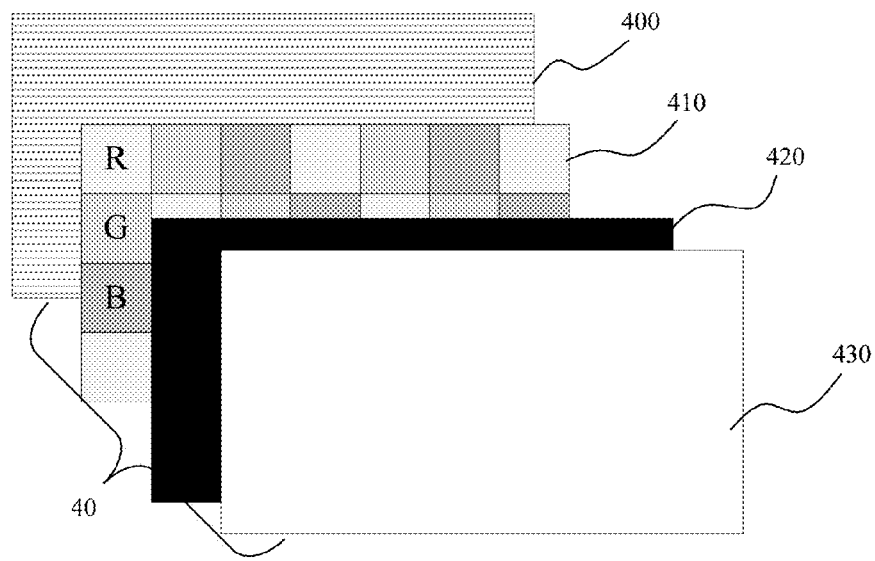
FIG. 4 is a structural schematic diagram of a color filter substrate according to an embodiment of the present disclosure.

FIG. 4 is a structural schematic diagram of a color filter substrate according to an embodiment of the present disclosure. The components of the color filter substrate will be explained hereinafter with reference to FIG. 4.

As shown in FIG. 4, the color filter substrate 40 comprises a glass substrate 430, a black matrix BM 420, a RGB color layer 410, and a transparent conductive layer 400, wherein the black matrix BM 420 is provided on the glass substrate 430, the RGB color layer 410 is located in the gaps of the black matrix BM 420, and the transparent conductive layer 400 is provided on the black matrix BM 420 and the RGB color layer 410.

It should be noted that, in the present embodiment, the transparent conductive layer 400 of the color filter substrate is different from a whole piece of complete transparent conductive layer as in the prior art, but is formed by segmenting a complete transparent conductive layer into pieces. The transparent conductive layer 400 comprises a plurality of first coplanar transparent conductive layers and a plurality of second coplanar transparent conductive layers, wherein the first coplanar transparent conductive layers are spaced from the second coplanar transparent conductive layers. Each of the first coplanar transparent conductive layers is arranged in a region corresponding to a corresponding one of gate lines of the array substrate, and is applied with a signal in synchronism with and the same as a driving signal of the corresponding gate line. Each of the second coplanar transparent conductive layers is arranged in a region corresponding to a corresponding one of pixels of said array substrate, and serves as common electrode. The first coplanar transparent conductive layers and the second coplanar transparent conductive layers are all transparent conductive layers without patterns therein. Preferably, the first coplanar transparent conductive layers and the second coplanar transparent conductive layers are all made of Indium tin oxide.

The structure of the transparent conductive layer corresponding to one sub pixel of the array substrate will be described hereinafter with reference to FIG. 5 in order to further interpret the present embodiment.

Figure 5:
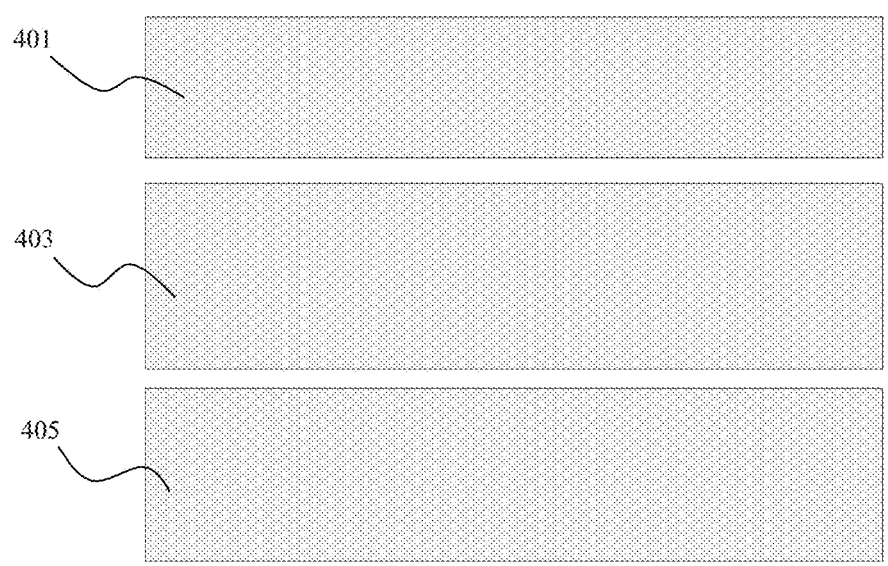
FIG. 5 is a schematic diagram of a transparent conductive layer of a color filter substrate corresponding to the sub pixel as shown in FIG. 2.

FIG. 5 is a schematic diagram of a transparent conductive layer of a color filter substrate corresponding to the sub pixel as shown in FIG. 2. From the illustration of FIG. 2 hereinabove, it is known that the sub pixel comprises a main pixel region M, a secondary pixel region S, and a gate line 11 in the main pixel region and a gate line 11' in the secondary pixel region that are used for separating the main pixel region M from the secondary pixel region S.

As shown in FIG. 5, the transparent conductive layer corresponding to the sub pixel comprises a transparent conductive layer 401 in M region corresponding to the main pixel region M, a transparent conductive layer 403 in the gate line region corresponding to the region of the gate lines, and a transparent conductive layer 405 in S region corresponding to the secondary pixel region S. In the peripheral circuit region, the transparent conductive layer 401 in M region and the transparent conductive layer 405 in S region are connected together to serve as common electrode. The voltage of the transparent conductive layer 403 in the gate line region is in synchronism with and the same as the driving signal of the gate line 11 in the main pixel region. In addition, the distance between the transparent conductive layer 401 in M region (or the transparent conductive layer 405 in S region) and the transparent conductive layer 403 in the gate line region ranges from 2.5 μm to 15 μm.

It is worth mentioning that, FIG. 5 is only one embodiment of the present disclosure, and the present disclosure is not limited by this. Other transparent conductive layers of color filter substrate using the principles of the present disclosure also fall within the protection scope of the present disclosure.

In summary, according to embodiments of the present disclosure, the transparent electrodes of the color filter substrate are separated into transparent electrodes corresponding to the region of gate lines of the array substrate and transparent electrodes corresponding to the region of pixels of the array substrate, which are applied with different signals, so that there is no voltage difference between the gate lines of the array substrate and the transparent electrodes of the color filter substrate. Therefore, the signal attenuation of the gate lines of the array substrate caused by the coupling capacitance therein can be avoided and the display quality of display panels can be improved.

The preferred embodiments of the present disclosure are stated hereinabove, but the protection scope of the present disclosure is not limited by this. Any changes or substitutes readily conceivable for any one skilled in the art within the technical scope disclosed herein shall be covered by the protection scope of the present disclosure. Therefore, the protection scope of the present disclosure shall be determined by the scope as defined in the claims.

The invention claimed is:

1. A color filter substrate, comprising first coplanar transparent conductive layers, and second coplanar transparent conductive layers that are spaced from said first coplanar transparent conductive layers,
    wherein each of said first coplanar transparent conductive layers is arranged in a region corresponding to a corresponding one of gate lines of an array substrate, and is applied with a signal in synchronism with and the same as a driving signal of said corresponding gate line;
    each of said second coplanar transparent conductive layers is arranged in a region corresponding to a corresponding one of pixels of said array substrate, and serves as a common electrode; and
    said first coplanar transparent conductive layers and said second coplanar transparent conductive layers are transparent conductive layers without patterns therein,
    wherein each sub pixel of said array substrate comprises a main pixel region and a secondary pixel region, and each of said first coplanar transparent conductive layers is applied with a signal in synchronism with and the same as a driving signal of a corresponding gate line in said main pixel region,
    wherein the gate line corresponding to the main pixel region is different from the gate line corresponding to the secondary pixel region in the same sub pixel and the gate line corresponding to the main pixel region and the gate line corresponding to the secondary pixel region in the same sub pixel correspond to the same first coplanar transparent conductive layer.

2. The color filter substrate according to claim 1, wherein said first coplanar transparent conductive layers and said second coplanar transparent conductive layers are made of indium tin oxide.

3. The color filter substrate according to claim 1, wherein the distance between said first coplanar transparent conductive layers and said second coplanar transparent conductive layers ranges from 2.5 µm to 15 µm.

4. The color filter substrate according to claim 2, wherein the distance between said first coplanar transparent conductive layers and said second coplanar transparent conductive layers ranges from 2.5 µm to 15 µm.

5. A display panel, comprising an array substrate and a color filter substrate arranged opposite to and parallel with said array substrate, said color filter substrate comprising first coplanar transparent conductive layers and second coplanar transparent conductive layers that are spaced from said first coplanar transparent conductive layers, wherein each of said first coplanar transparent conductive layers is arranged in a region corresponding to a corresponding one of gate lines of an array substrate, and is applied with a signal in synchronism with and the same as a driving signal of said corresponding gate line;

each of said second coplanar transparent conductive layers is arranged in a region corresponding to a corresponding one of pixels of said array substrate, and serves as a common electrode; and said first coplanar transparent conductive layers and said second coplanar transparent conductive layers are transparent conductive layers without patterns therein, wherein each sub pixel of said array substrate comprises a main pixel region and a secondary pixel region, and each of said first coplanar transparent conductive layers is applied with a signal in synchronism with and the same as a driving signal of a corresponding gate line in said main pixel region, wherein the gate line corresponding to the main pixel region is different from the gate line corresponding to the secondary pixel region in the same sub pixel and the gate line corresponding to the main pixel region and the gate line corresponding to the secondary pixel region in the same sub pixel correspond to the same first coplanar transparent conductive layer.

6. The display panel according to claim 5, wherein said first coplanar transparent conductive layers and said second coplanar transparent conductive layers are made of indium tin oxide.

7. The display panel according to claim 5, wherein the distance between said first coplanar transparent conductive layers and said second coplanar transparent conductive layers ranges from 2.5 µm to 15 µm.

8. The display panel according to claim 6, wherein the distance between said first coplanar transparent conductive layers and said second coplanar transparent conductive layers ranges from 2.5 µm to 15 µm.

* * * * *